United States Patent [19]

Lecerf

[11] Patent Number: 4,863,289
[45] Date of Patent: Sep. 5, 1989

[54] SIDE ROLLER SYSTEM FOR A VEHICLE SEAT FRAME

[75] Inventor: Olivier Lecerf, Farmington Hills, Mich.

[73] Assignee: Bertrand Faure Automobile, Rocquencourt, France

[21] Appl. No.: 267,897

[22] Filed: Nov. 7, 1988

[51] Int. Cl.⁴ .......................... B60N 1/08; F16C 19/49
[52] U.S. Cl. ....................................... 384/47; 248/430; 296/65.1; 384/25; 384/48
[58] Field of Search ........................ 384/25, 48, 47, 34, 384/49, 50, 56; 296/65.1; 248/429, 430

[56] References Cited

U.S. PATENT DOCUMENTS

| 3,460,794 | 8/1969 | Colautti | 248/430 |
| 4,072,347 | 2/1978 | Boisset | 248/429 X |
| 4,556,186 | 12/1985 | Langmesser, Jr. et al. | 384/34 X |

FOREIGN PATENT DOCUMENTS

| 737270 | 6/1966 | Canada | 248/430 |
| 2282349 | 3/1976 | France | 248/430 |
| 2449549 | 10/1980 | France | 248/430 |
| 2120091 | 11/1983 | United Kingdom | 248/429 |

Primary Examiner—Thomas R. Hannon
Attorney, Agent, or Firm—Dykema Gossett

[57] ABSTRACT

A seat track assembly is disclosed that comprises a fixed channel member and a sliding channel member disposed on the fixed channel member. The channel members are interfitted with generally U-shaped engagement members. A first ball bearing assembly is disposed at one vertical position between the two channels, and a second disc-shaped bearing is disposed at a lower vertical position between the U-shaped flanges of the two channels. The second bearing provides support in both the vertical and horizontal directions to prevent seizing between the two channels. The second bearing is resilient and acts to prevent seizing of the two channels by providing a resilient force vertically in opposition to the upward force created by the seat back when the seat is unoccupied and also provides resilient forces horizontally to prevent seizing due to twisting of the channels.

2 Claims, 2 Drawing Sheets

SIDE ROLLER SYSTEM FOR A VEHICLE SEAT FRAME

BACKGROUND OF THE INVENTION

The present invention in general relates to a bearing system for use with two slidably disposed channels that comprise an axial positioning system for a vehicle seat.

Modern automobiles are typically equipped with vehicle seats that can be positioned in any one of several directions. Typically, vehicle seats comprise a track arrangement that allows the seats to be axially moved rearwardly and forwardly in the vehicle cab. The vehicle seats are moved under the power of the seat's occupant, and it is desirable that the seat can be moved freely.

It is desirable that the track assembly be firmly constrained so as to move only directly rearwardly and forwardly. This prevents twisting of the track assemblies and the accompanying horizontal binding of the tracks. However, if the tracks are constrained by increasing the contact area between the track members, binding may occur.

The prior art has consisted generally of a lower fixed channel member and an upper slidably disposed channel member. Problems may arise when no weight is on the seat and the seat back is rotated horizontally forward and rearward which can cause a twist on the track assembly that can result in the sides of the track assembly binding together.

Thus, it is an object of the present invention to provide a seat track assembly that will resist binding.

More specifically, it is an object of the present invention to provide a seat track assembly that provides one or more resilient members to oppose the force of the upper channel member that is caused by load being applied to the seat back when no weight is on the seat.

It is further an object of the present invention to provide a bearing assembly that will act to prevent side twisting and side load between the channel members and provide improved stability.

SUMMARY OF THE INVENTION

The present invention provides a seat track assembly for axially positioning vehicle seats that will resist binding and provide smooth sliding action. The present invention discloses a seat track assembly that includes a resilient member that acts to prevent binding due to the force applied from the seat back location. The present assembly also includes a member that acts to prevent twisting of the track members and the associated binding of the seat track assembly members with respect to each other.

The present invention achieves the above-stated goals by providing a lower channel member that is fixed to the vehicle frame and upon which is slidably mounted an upper channel member. Both the lower fixed and upper slidable channel members have substantially flat base members and associated U-shaped engagement members at their extreme ends. The U-shaped engagement member of the fixed channel interfits with the U-shaped engagement member of the slidable channel in order to provide a sliding surface for the seat track assembly. A plurality of ball bearings are disposed between one surface of the fixed channel's U-shaped engagement member and the flat base of the sliding channel. Further, disc-shaped bearings are provided between the U-shaped engagement members of the fixed channel and the moving channel. The disc-shaped bearing members act to resiliently oppose the upward force of the load applied to the seat back and at the same time resist twisting and side loads between the fixed channel and the sliding channel, thus preventing seizing of the channels. Moreover, the present construction provides a smoother sliding action between the upper and lower channel members.

It is further an object of the present invention to achieve the above features and goals of this invention in a vehicle seat track assembly that is sturdy and comprised of relatively few movable parts.

The above-mentioned objects and features of the present invention can be better understood when considered in combination with the following specification and drawings.

DETAILED DESCRIPTION OF THE PREFERRED EMBODIMENT

Figure 1:
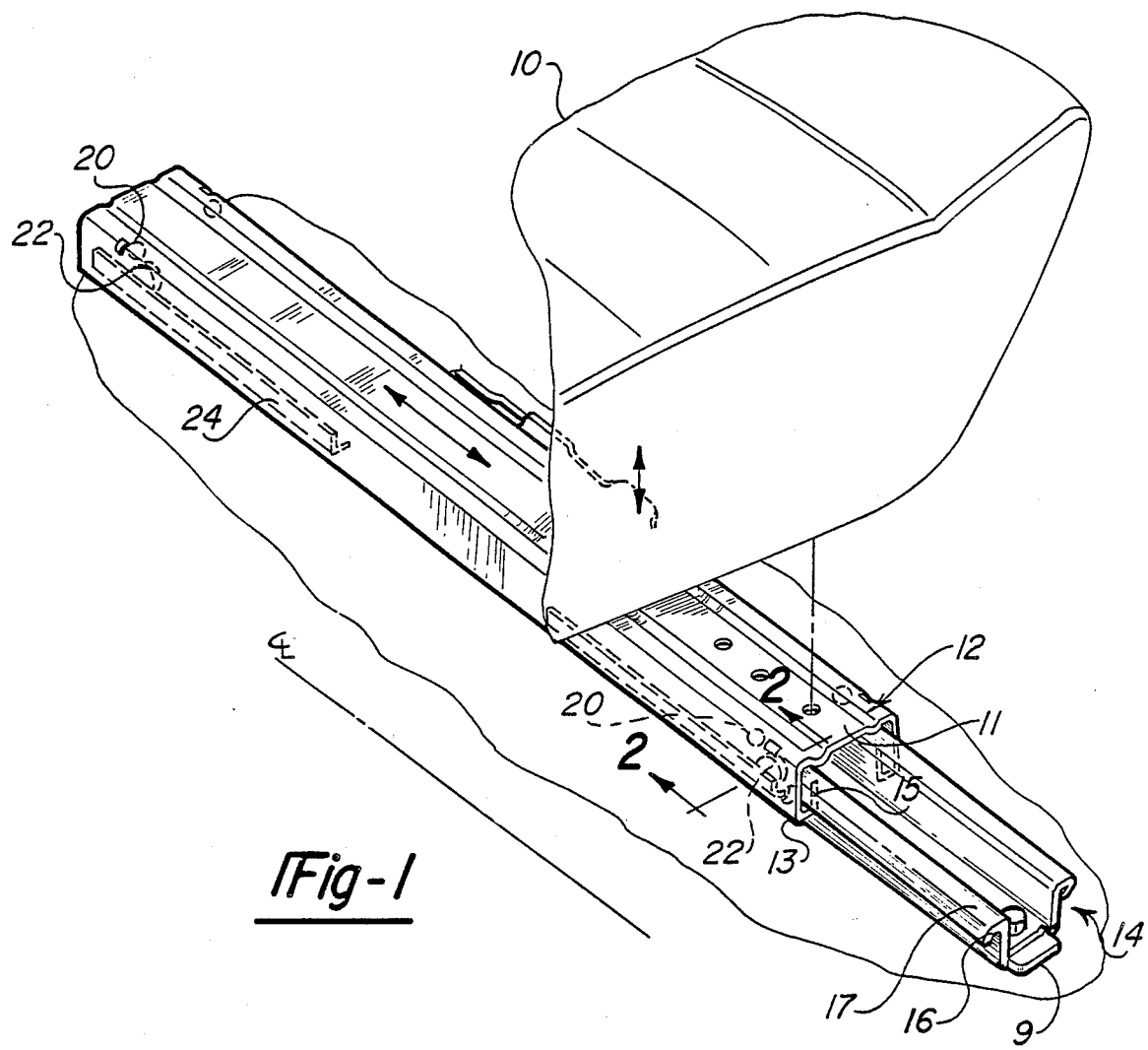
FIG. 1 is a perspective view showing the vehicle seat track assembly of the present invention mounted below a vehicle seat.

FIG. 1 shows the vehicle seat track positioning assembly of the present invention being disposed underneath the vehicle seat 10. As can be seen in FIG. 1, the seat track assembly comprises generally a first lower channel 14 that is fixed to the vehicle floor 9 and an upper channel 12 that is slidably disposed upon the lower channel 14.

Figure 2:
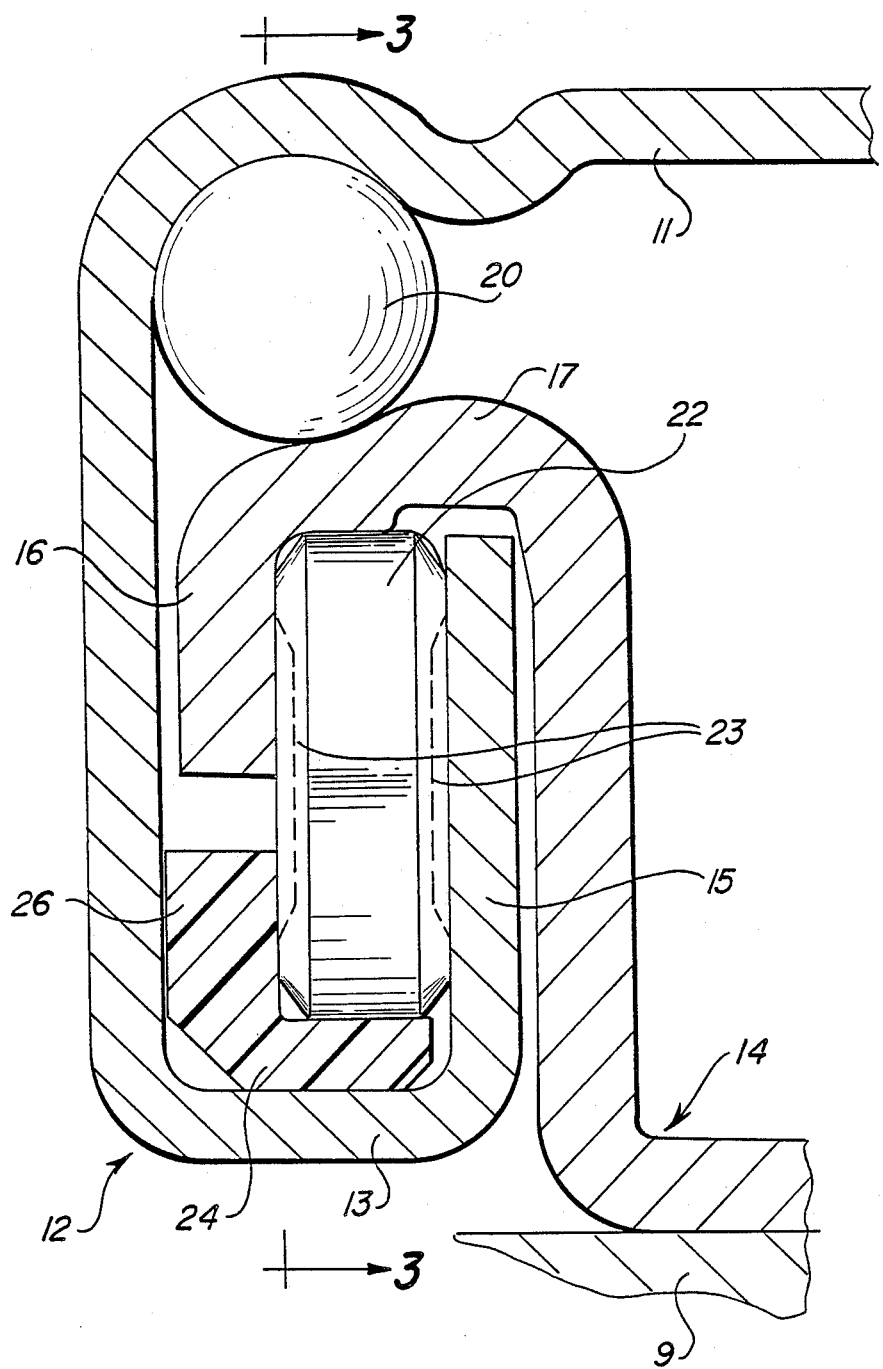
FIG. 2 is a lateral partial cross-section taken along line 2—2 in Figure 1 through one-half of the seat track assembly of the present invention.

The lower channel 14 comprises a fixed base portion and two upwardly extending lateral sides. The uppermost extent of the lateral sides turn outwardly and downwardly in generally U-shaped engagement members. The generally U-shaped engagement members are comprised of a first base portion 17 and a second downwardly extending portion 16. Only the left side of the upper and lower channels is illustrated in FIG. 2; however, it is to be understood that an identical right side assembly is formed at the opposite lateral end of the channels.

The upper channel member 12 comprises a flat central portion 11 and two downwardly extending lateral sides. The lateral sides have U-shaped engagement members disposed at their lowermost extent 13, 15. The U-shaped engagement members are formed by a first base portion 13 and an upwardly extending member 15.

Downwardly extending member 16 of the lower fixed channel 14 is disposed between the lateral side of the upper channel 12 and the upwardly extending part 15 of its U-shaped portion. This arrangement between the U-shaped members of the upper and lower channels allows for the guiding of the upper channel relative to the lower channel, thus permitting adjustment of the position of the seat 10.

The sliding portions of the upper and lower channel assemblies 12 and 14 are supported by a ball bearing and the disc bearing assembly. Ball bearings 20 are dispersed axially along the extent of the seat track assembly. The bearings are disposed between the base 17 of the U- shaped engagement member of the lower fixed channel 14 and the inner portion of the base 11 of the upper sliding channel 12. Further, resilient disc bearings 22 are disposed between the downwardly extent 16 of the U-shaped engagement member of the lower fixed channel 14 and the upward extent 15 of the U-shaped engagement member of the upper channel 12. Moreover, the disc bearings 22 are disposed vertically between the base 17 of the U-shaped engagement member of the lower fixed channel 14 and the base 13 of the U-shaped engagement member of the upper sliding channel 11. A resilient track insert 24 is placed between the base 13 and the disc-shaped bearings 22 for supporting the disc bearings. A portion 26 of the resilient track or base 24 also acts to provide lateral side support to the disc-shaped bearings 22.

The disc-shaped bearings 22 act to maintain the proper spacing between the U-shaped members so as to prevent binding by twisting, side loads, and upward movement of the upper channel 12. The disc-shaped bearings 22 and support 24 in combination with ball bearings 20 provide for smoother sliding action between channel members 12 and 14.

Figure 3:
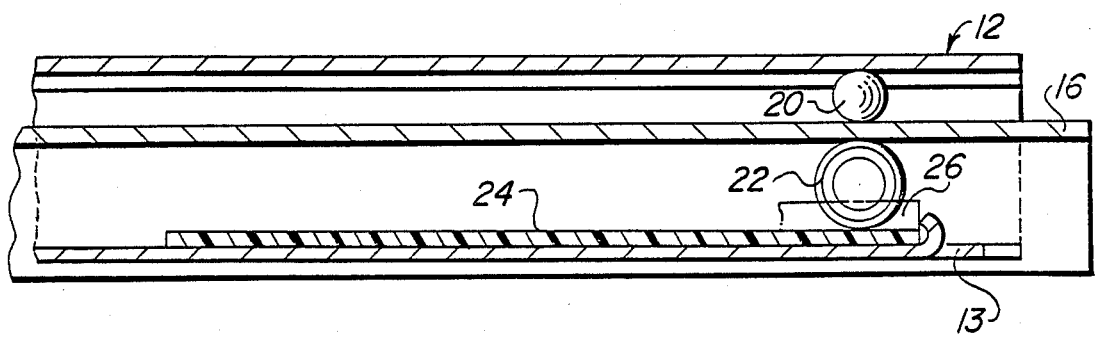
FIG. 3 is a longitudinal cross-section taken along line 3—3 in FIG. 2 through a portion of the vehicle seat track assembly of the present invention.

As shown in FIG. 3, the resilient track support 24 extends for a length of travel that would approximate the extent of travel of the vehicle seat assembly 10. Bearings 22 roll along the support 24 as the seat 10 is advanced and retracted. As can be seen in FIGS. 2 and 3, the downward force of the seat occupant's weight would be transmitted to the upper channel member 12 and through the bearing 20. This force could cause the portion 15 of the U-shaped engagement member of the upper channel 12 to bind upon the portion 17 of the lower channel 14. The use of the disc bearings 22 and resilient base 24 causes a downward force in opposition to the upward force caused by a horizontal push on the seat back. This opposing force will resist binding between the upper and lower channel members 12 and 14.

In addition, since the disc bearings 22 are disposed between the extents 15 and 16 of the U-shaped portions of the upper and lower channel members, twisting and side loads will be resisted.

The disc-shaped bearing 22 may include opposed recessed side walls as shown by phantom lines 23 in FIG. 2. The advantage of this configuration is that it can resist twisting and side loads without causing unnecessary friction during sliding movement.

A seat track assembly has been disclosed that resists binding in both the horizontal and vertical directions. The assembly is comprised of relatively few moving parts and can be manufactured and assembled cheaply.

A working embodiment of the present invention has been disclosed; however, this is not intended to limit the scope of the invention. Further modifications of the invention are intended to be within the scope of the present invention.

The intended scope of the present invention is best understood by the appended claims.

I claim:

1. A track assembly for allowing axial positioning of an automobile seat comprising:

an upper channel assembly fixed to a vehicle seat;

a lower channel assembly fixed to a vehicle floor;

said upper channel assembly being slidably mounted on said lower channel assembly;

said upper channel assembly having a base and being generally C-shaped with both ends of said C-shape channel assembly being turned inwardly into generally U-shaped flanges, said lower channel being generally C-shaped with both ends of the C-shape channel being turned outwardly into generally U-shaped flanges, and said U-shaped flanges each having a base portion;

said upper channel being horizontally wider than said lower channel;

said lower channel U-shaped flanges extending into said upper channel U-shaped flanges;

a first bearing member being disposed between said upper channel base and a base portion of said lower channel U-shaped flange;

a bearing assembly being disposed between said U-shaped flanges of both said upper and lower channels to resist vertical and side loads on said track assembly; and said bearing assembly is disposed between, and abuts, said U-shaped flanges along both a vertical and a horizontal axis, and said bearing assembly comprises a second bearing member and a resilient support member, said resilient support member being disposed between said second bearing member and said upper channel U-shaped flange, and further wherein said resilient support member abuts and provides support for said second bearing member in both vertical and horizontal directions.

2. A track assemby as recited in claim 1, and further wherein said bearing assembly includes a disc-shaped roller.

* * * * *